United States Patent [19]

Haerle

[11] Patent Number: 4,971,769
[45] Date of Patent: Nov. 20, 1990

[54] FILTER DEVICE FOR USE IN HEATING OR INCINERATION PLANTS

[75] Inventor: Hans A. Haerle, Bopfingen, Fed. Rep. of Germany

[73] Assignee: Schwaebische Huettenwerke GmbH, Fed. Rep. of Germany

[21] Appl. No.: 395,852

[22] Filed: Aug. 18, 1989

[30] Foreign Application Priority Data

Aug. 20, 1988 [DE] Fed. Rep. of Germany ....... 3828347

[51] Int. Cl.$^5$ ............................................. B01D 50/00
[52] U.S. Cl. ..................................... 422/171; 55/523; 55/DIG. 30; 55/484; 60/311; 60/299
[58] Field of Search ................ 55/523, DIG. 30, 484; 60/311, 299; 428/312.2, 312.6, 312.8, 315.9; 422/180, 171

[56] References Cited

FOREIGN PATENT DOCUMENTS

| | | | |
|---|---|---|---|
| 0042301 | 12/1981 | European Pat. Off. | 55/DIG. 30 |
| 1453653 | 8/1966 | France | 55/484 |
| 287451 | 12/1986 | Japan | 422/180 |
| 225221 | 10/1987 | Japan | 55/423 |

Primary Examiner—Bernard Nozick
Attorney, Agent, or Firm—Welsh & Katz, Ltd.

[57] ABSTRACT

A device for use in heating or incineration plants for use as a waste gas filter to eliminate and/or convert harmful elements in the waste gas is disclosed. The device of the subject invention can eliminate soot and soot-like products, or it can serve as a heat exchanger or as a mixing component for a furnace. The device of the subject invention comprises a sintered body made of one or more compression molded highly heat resistant sintered parts. The sintered body manifests high porosity and/or a multitude of intake and outlet channels.

20 Claims, 2 Drawing Sheets

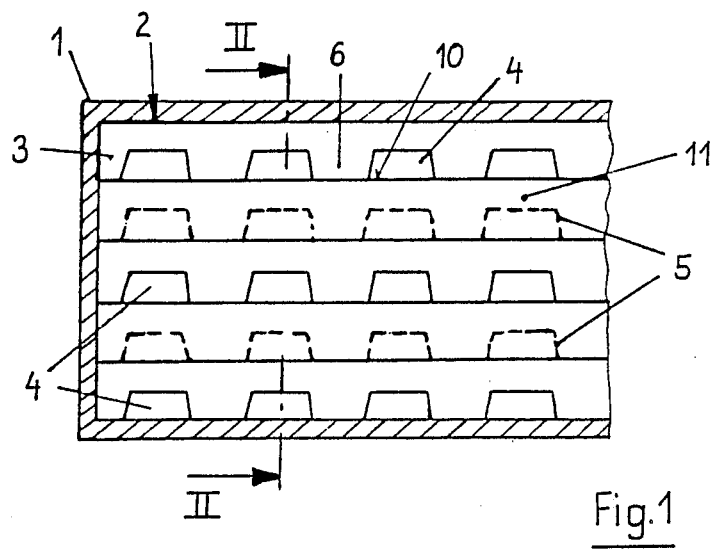
Fig.1
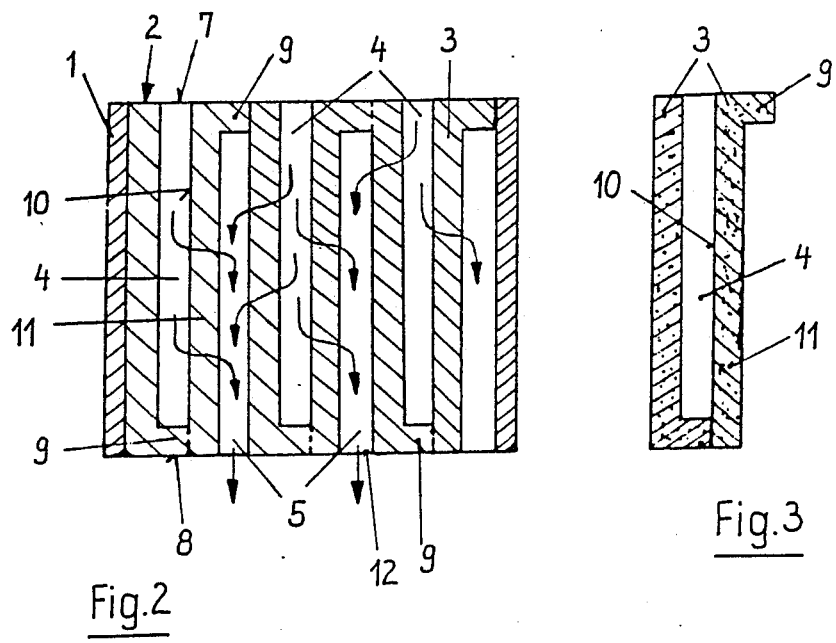
Fig.2
Fig.3

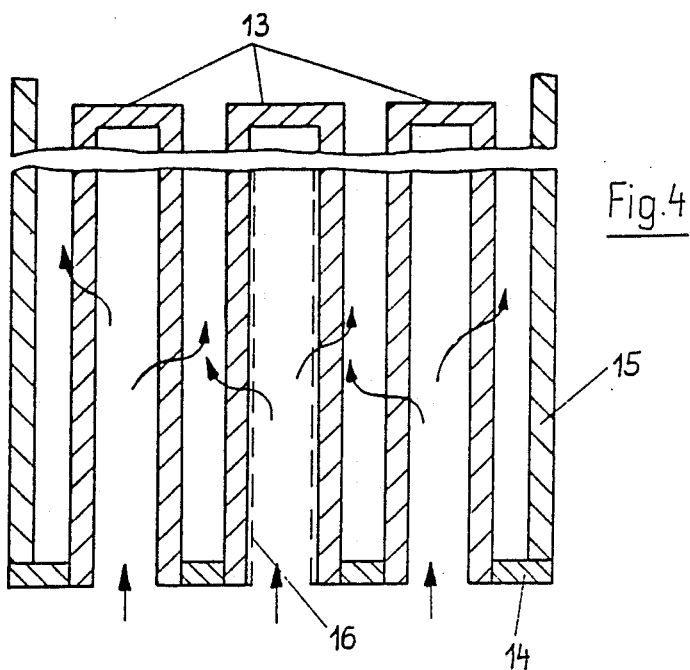
Fig. 4
Fig. 6
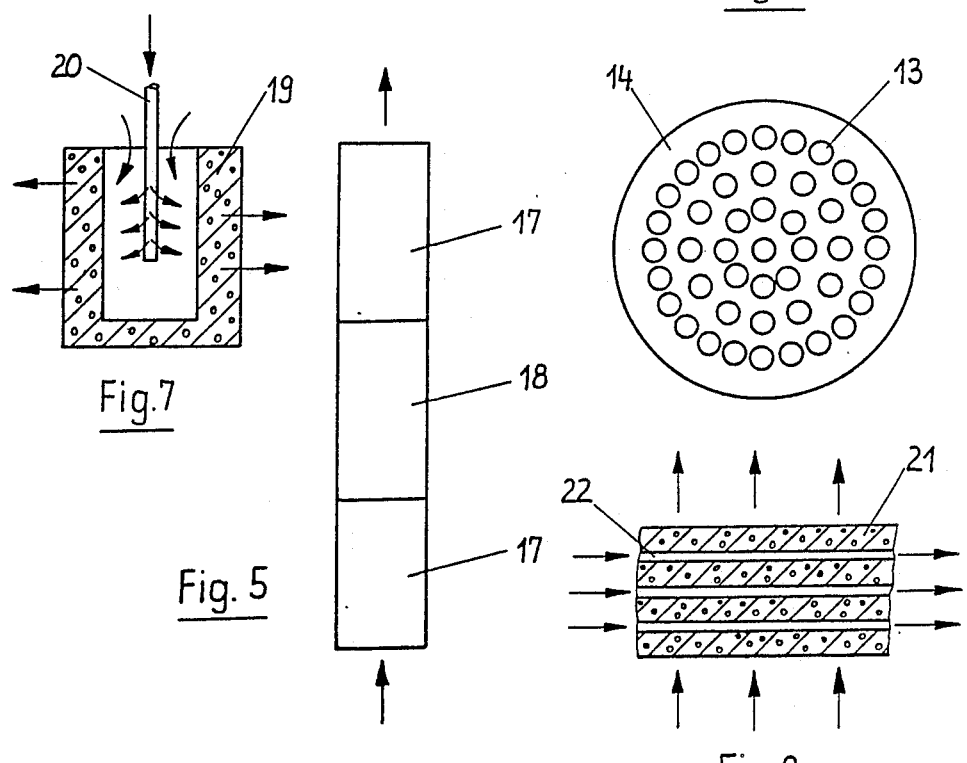
Fig. 7
Fig. 5
Fig. 8

FILTER DEVICE FOR USE IN HEATING OR INCINERATION PLANTS

BACKGROUND OF THE INVENTION

The subject invention relates to an apparatus for use as a waste gas filter in heating or incineration plants to eliminate or convert harmful elements in the waste gas, and more particularly to a device for eliminating soot and soot-like products in a heat exchanger or in a mixing apparatus for a furnace.

When burning fossil fuels such as coal, wood and oil, environmentally harmful and partially poisonous substances are released to the atmosphere. In the past, for financial reasons, no measures have been taken in relation to these substances for small units, especially heating boilers for residential housing, waste gas from industrial heating and incineration plants other than filtering. This applies in particular for heating plants and for incineration units used to incinerate domestic and industrial waste. With filtering, either the effort and thus the cost of removing the harmful elements is very high, or the degree of efficiency is insufficient.

Increasing the efficiency of a heating plant requires good heat exchange or heat transfer, both with respect to heating the industrial or boiler water and with respect to the furnace and the efficiency of the unit itself. The same applies to the burner in a heating unit. The more intensive and therefore the better the fuel mixes with air, the better the combustion and the lower the quantity of harmful waste gases emitted.

The present invention is therefore based on the problems associated with producing an apparatus as described heretofore which overcomes such problems and drawbacks and which, for example, has a high degree of efficiency as a waste gas filter, a heat exchanger or as a mixing apparatus for a furnace at a reasonable cost, and yet which is simple to produce and suitable for a variety of uses.

SUMMARY OF THE INVENTION

According to the subject invention, there is a sintered body consisting of one or more molded sintered parts which are resistant to high temperatures, with high porosity and/or a multitude of intake and outlet channels.

A sintered body of the subject invention is optimally suited for use in heating and incineration plants in several ways, primarily because of its high porosity, and its concomitant high permeability to gases and fluids. These properties can be further improved by drilling holes, channels or the like. Thus, waste gases can be passed through while also converting soot or sooty gases at substantially lower temperatures. For example, by the subject invention, soot can be converted at temperatures of 200° C. to 250° C., and 50% of the soot can be converted at temperatures of only 300° C. to 400° C. At 500° C. to 700° C., the soot conversion should be virtually 100%.

Another benefit which as been observed is that the efficiency of conversion improves very rapidly through use of the subject invention, even at the lower end of the temperature scale. Thus, the waste gas filter according to the invention is also suitable for removing harmful waste gases from heating or incineration plants. The substantially higher efficiency presumably lies in the increased thermal conductivity of the sintered body with the thermally efficient conductive metal sintered parts, whereby a catalytic effect may also come into play.

Care need only be taken to ensure that the material used for the sintered body has a high enough melting point, i.e., that suitably heat resistant materials are used. The sintering and molding prior to sintering must also be carried out in such a way that excessive compression does not occur in order to permit suitable gas permeability. Selection of a suitable molding pressure and of a suitable type and size of parts for sintering, however, means that classification to a further range is possible here.

In addition to having good efficiency, the manufacturing expense and costs of the sintered body according to the subject invention, e.g., as a waste gas filter, are not particularly high. Because of the capability of a sintered body made of sintered parts to maintain its form, a sintered body of this type can be molded and then sintered in any shape. This means that the filter can always be optimally adapted to the available space or other peculiarities. For example, square, rectangular, round or oval shapes are possible.

The sintered body of the subject invention can also be used for gasifying liquid fuels, such as heating oil, thus permitting the efficiency of the boiler to be improved in a simple manner. All that is needed is to pass the liquid fuel through its pores or openings, whereby it is gasified. If air is also fed in at this stage, a highly flammable mixture can be obtained. The gasifying effect is further improved by the high surface area of the sintered body. The porosity provides good mixing or swirling of the air and fuel mixture, which in turn improves the combustion efficiency. The oxygen required for combustion can also be fed into the sintered body through appropriate holes or channels.

To improve efficiency, the waste gas may be fed back across the sintered body to preheat it, again improving the gasification effect. Another benefit of this measure is that only small quantities of harmful nitrogen oxides are produced.

Another possible application for the sintered body according to the subject invention arises from the fact that it can be used as a heat exchanger with a high degree of efficiency. The hot gases produced by a boiler, or even the actual flames, heat the sintered body according to the invention which, is then used on account of its high porosity and generally in conjunction with additional holes for heat release to heat the relevant medium, generally water.

The sintered body could also be formed of several identical compression molded parts, joined to one another and to a common sintered body.

Because the sintered body is made up of several identical compression molded parts, it can be made in a modular manner to suit the shape and size requirements, thereby simplifying production and reducing the cost, as sintered bodies with fewer or with only one basic part could be put together as, for example, a waste gas filter of any size. It can also be extended or made larger at a later date if the heating plant or incinerator is made larger.

The individual compression molded parts may be individually sintered and then joined together or (and this is generally more beneficial) the compression molded parts can be jointly sintered into a single monolithic sintered body after they have been molded, thus forming a solid and homogeneous sintered body. This also means that few molds are needed to produce the compression molded parts. A single mold may suffice.

Producing the sintered body as a compression molded part means that the shape and type of channel in the body may be varied as required, enabling the channel to be optimally adapted to the conditions present. For example, the compression molded parts could each have a row of intake or outlet channels for a waste gas filter, or straight through channels for a heat exchanger, depending on the way they were assembled. The channels can also be any required shape.

Also, each compression molded part could be a plate with several spaced channels molded into a lateral wall; in a waste gas filter the channels are open on one face of the plate to form an intake or outlet channel and closed on the opposite face by cross struts.

This type of design would need only a single mold, and each plate can be used both as an intake and as an outlet, depending on the positioning or arrangement of the individual plates.

In order to achieve a simple modular design, so that any number of compression molded parts can be joined together, the compression molded parts are formed in such a way that the open sides of the channels are covered by the lateral wall on the channel side of the opposite lateral wall of the adjacent compression molded part. In general, the compression molded parts or sintered parts should be enclosed by a sheet steel housing to hold them. The steel housing should be sintered to the compression molded parts or sintered parts, to give a compact unit and a soot filter which, on account of its homogeneity and uniformity, would be more suitable for heavy loads.

The compression molded parts may be made of highly heat resistant steel powder alloyed with, for example, chrome and/or molybdenum, such as X6CrMo17. Additional elements with catalytic effects, such as platinum, rhodium or palladium could also be added, as known in the art. In this manner, catalytic effects can be obtained from the filter to convert further harmful waste gas components, such as carbon monoxide, hydrocarbons and nitric oxides.

The sintered body could also be made of pieces of metal wire or metal shavings which are compression molded and then sintered once they have been molded. By forming a sintered body from pieces of metal wire or metal shavings, a part or component with very low density and high material toughness is obtained. Such sintered parts have high absorbency for infiltration or for throughput, making them even better suited to the proposed applications. The pieces of metal wire or metal shavings used can have a diameter or width of 0.1–5 mm and a length of approx. 0.5–30 mm, preferentially 1–3 mm and 2–10 mm, respectively. Other dimensions may be possible within the framework of the invention to suit the application.

A good shape for the sintered body may be a cylindrical shape, whereby the waste gases pass through the cylinder from the outside to the inside or form the inside to the outside when used as a filter tube.

In a further constructive example of the invention, the sintered body has several closed filter tubes, or modules each closed on one side and arranged next to one another and/or behind one another, through which the waste gases pass from the outside to the inside or from the inside to the outside. This example has the advantage of more facile interchangeability of the individual modules, should they become damaged, blocked, or the like.

DETAILED DESCRIPTION OF THE DRAWINGS

Examples of the invention are described in principle in more detail below, on the basis of the drawing.

FIG. 1 is a sectional top view of a sintered body according to the invention for use as a waste gas filter;

FIG. 2 is a sectional view across line II—II from FIG. 1;

FIG. 3 is a side section of two individual compression molded parts;

FIG. 4 is a cross-sectional view of a sintered body as a filter element in a different embodiment;

FIG. 5 is a schematic showing several filters arranged one behind the other;

FIG. 6 is a top view of the filter element of FIG. 4;

FIG. 7 is a sintered body according to the subject invention used as a mixing body; and FIG. 8 is a sintered body according to the subject invention used as a heat exchanger.

DESCRIPTION OF PREFERRED EMBODIMENTS

The sintered body used as a waste gas filter as per the example and shown i FIGS. 1–3 has a sheet steel housing 1 as a container for the sintered body 2, which comprises several plates 3 as compression molded parts. The compression molded parts 3 are sintered. Each compression molded part 3 or each plate has several channels molded into a lateral wall, which can be used as intake channels 4 or outlet channels 5, depending on the arrangement. The channels run parallel to the side edges of the plates and their depth is roughly half the plate width. The individual channels are separated from one another by walls 6, which are roughly the same width as the channels. As clearly seen in FIGS. 1 and 2, each inlet channel 4 is in alignment with a plurality of outlet channels 5, and each outlet channel 5 is in alignment with a plurality of inlet channels 4.

As can be seen from FIG. 2 and the single drawing in FIG. 3, the channels 5 or 6 are open on one face 7, and closed on the opposite face 8 by a cross strut 9. Throughput through the waste gas filter according to the invention is in the direction indicated by the arrows in FIG. 2. As can also be seen (FIG. 2), the open sides of the channels 4 or 5 are covered by the lateral wall 10 or the back wall opposite the lateral wall containing channels 4 or 5 by adjacent plates 3. This results in a closed channel system, in which the ends facing away from the intake side are closed off by a cross strut 9. As can be seen from the arrows in FIG. 2, the waste gases flow through the intake openings 7 into the intake channels 4 and thereby permeate the porous filter walls 11 of the plate 3, as the lower end of each intake channel 4 is closed off by a cross strut 9. The chemical reaction of the soot, i.e., its conversion into ash takes place in the filter walls 11. From the filter walls 11, the cleaned waste gases go to the outlet channels 5 and from there to the outlet openings 12. On the intake side, the outlet channels 5 are also closed off by cross struts 9. The number and shape of plates 3 can be varied as required. The same applies to the number of channels 4 and 5, and the length of the plates 3.

As can also be seen in FIG. 2 and especially also in FIG. 3, all the plates or compression molded parts 3 are the same, being in modular form, the arrangement of the individual plates determines the shape and existence of the inlet channels 4 and the outlet channels 5.

In FIG. 2, the dividing lines at which the compression molded parts are joined together during sintering are shown as dotted lines. In FIG. 3, two compression molded parts are shown before sintering.

As can be seen from the figures, adjacent plates are all arranged at 180 degrees to each other, or "head to toe." The rear side 10 of one compression molded part 3 is placed against the front end of the adjacent cross strut 9 or the wall 6.

Production of the waste gas filter according to the invention is by compression molding of the plates. The required number are then positioned next to each other in the required manner and they are sintered together. This results in a monolithic sintered body 2. Subsequently or, at the same time, the sheet steel housing 1 can be sintered onto the outer plates 3 to give a suitably stable and sealed connection. If necessary, all that this requires is that sintering powder with a low melting point be put between contacting elements in order to produce a bond between the compression molded parts and the sheet steel housing 1.

The compression molded parts can be made of high quality alloying steel powder or of suitable heat resistant and high quality metal wires or metal shavings, which are sintered in the same way as metal powder. If metal wires or metal shavings are used, better permeability and less current resistance will be obtained for the waste gas being cleaned.

FIGS. 4, 5, and 6 show a further embodiment of the sintered body according to the subject invention, a waste gas filter. As can be seen, several individual filter cylinders 13 can be arranged either next to one another or behind one another. When arranged next to one another for parallel throughput, the cylinders are preferentially arranged in circular fashion in several rows (FIG. 6). The filter cylinders 13 are open on one side, namely the intake side, and closed on the opposite side. They can be jointly, possibly interchangeably, mounted on or in a base plate 14. A surrounding wall 15 closes off the waste gas filters to the outside.

As can be seen, the waste gases which are to be cleaned enter the open end of the cylinder filters 13, pass through their circumferential walls and emerge clean at the opposite end.

If one wall of the cylinder filter 13, preferentially the inner circumferential wall, is coated with a catalytic material, then if necessary, not only can combustion of the soot elements be obtained, but other harmful waste gases can also be converted. The dotted line 16 in FIG. 4, shows this embodiment.

The filter body of the subject invention may also be combined with known filters or with filters according to the subject invention of different composition or porosity or of different design. With reference to FIG. 5, for example, the waste gas filters are arranged one behind the other; the filters can be of different types. In this way, efficiency is improved still further.

The waste gas filter according to the subject invention can be fitted at any point in the waste gas removal system for a heating or incineration plant. In general, however, it will be fitted as near as possible to the point where the burning process occurs so that the waste gas temperature, which should still be high at that point, can be used for increased efficiency. The waste gas filter can also be integrated with a heat exchange system.

FIG. 7 shows a schematic diagram of one example of a hydrodynamic body used as a mixing component 19 for a burner. The sintered body is pot shaped, with a feed pipe 20 for a liquid or gaseous fuel sticking out into the inside of it. The circumference of the feed pipe 20 has outlet openings through which the fuel emerges and flows towards the inner circumferential wall of the mixing component 19. Air is also fed in either to the open inner area of the mixing component (see arrows) or directly through holes in the walls of the mixing component. A thorough mixing and swirling of the fuel and the air occurs on the surface area of the mixing component 19 and in the pores and/or holes whilst passing through from the inside to the outside. If the mixing component 19 is heated at the same time, e.g., from the actual combustion or as the result of feeding back waste gases, a liquid fuel can also be simultaneously gasified.

The example shown only shows the principle. Obviously, within the context of the invention, other embodiments are also possible.

FIG. 8 also shows a schematic of a sintered body according to the subject invention used as a heat exchanger 21. The hot waste gases pass through the sintered body 21 (direction of arrows from top to bottom), while, for example, water is simultaneously fed through cross flow holes or channels 22 (horizontal arrows) in order to heat it.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. A gas filter, suitable for removing soot and harmful elements from a combustion exhaust gas stream in heating and incineration plants, which comprises a plurality of identically sized and shaped gas-permeable, highly porous, compression molded and sintered catalytic metal plates, each plate having a front face and a back face; each front face containing a plurality of channels positioned between channel-separating walls; each channel having an open end and a closed end provided by a closing cross strut; with adjacent plates of said plurality being positioned with front faces against back faces and with adjacent plates being rotated 180° with respect to each other to provide a head-to-toe arrangement of adjacent plates for providing pluralities of inlet channels alternating with pluralities of parallel outlet channels within said gas filter; and with said plates being sintered together to form a monolithic filter body.

2. A gas filter according to claim 1 further including a gas-impermeable outer shroud containing said plurality of compression molded plates.

3. A gas filter according to claim 1 wherein said compression molded plates have rectangular front and back faces.

4. A gas filter according to claim 1 wherein said catalytic metal is selected from the group consisting of chromium, platinum, rhodium, palladium and molybdenum.

5. A gas filter according to claim 1 wherein said monolithic filter body is contained within and sintered to a gas impermeable outer shroud.

6. A gas filter according to claim 1 wherein each inlet channel is in alignment with a plurality of outlet channels and each outlet channel is in alignment with a plurality of inlet channels.

7. A gas filter according to claim 1 wherein said compression molded plates comprise compacted and sintered metal particulates.

8. A gas filter according to claim 7 wherein said metal particulates are selected from the group consisting of metal powder, metal wire pieces and metal shavings.

9. A gas filter according to claim 8 wherein said metal wire pieces and metal shavings have a width of from about 0.1 mm to about 5 mm and a length of from about 0.5 mm to about 30 mm.

10. A gas filter, suitable for removing soot and harmful elements from a combustion exhaust gas stream in heating and incineration plants, which comprises a plurality of identically sized and shaped gas-permeable, highly porous, compression molded and sintered metal plates; each plate having a front face and a back face; each front face containing a plurality of channels positioned between channel-separating walls; each channel having an open end and a closed end provided by a closing cross strut; with adjacent plates of said plurality being positioned with front faces against back faces and with adjacent plates being rotated 180° with respect to each other to provide a head-to-toe arrangement of adjacent plates for providing pluralities of inlet channels alternating with pluralities of outlet channels within said gas filter.

11. A gas filter according to claim 10 further including a gas-impermeable outer shroud containing said plurality of plates.

12. A gas filter according to claim 10 wherein said plates have rectangular front and back faces.

13. A gas filter according to claim 10 wherein each inlet channel is in alignment with a plurality of outlet channels and each outlet channel is in alignment with a plurality of inlet channels.

14. A gas filter according to claim 10 wherein said plates comprise compacted and sintered metal particulates.

15. A gas filter according to claim 14 wherein said metal particulates are selected from the group consisting of metal powder, metal wire pieces and metal shavings.

16. A gas filter according to claim 15 wherein said metal wire pieces and metal shavings have a width of from about 0.1 mm to about 5 mm and a length of from about 0.5 mm to about 30 mm.

17. A gas filter according to claim 10 wherein said compression molded plates comprise a catalytic metal.

18. A gas filter according to claim 17 wherein said catalytic metal is selected from the group consisting of chromium, platinum, rhodium, palladium and molybdenum.

19. A gas filter according to claim 10 wherein said plates comprise compacted and sintered metal particulates, and said plurality of plates are sintered together to form a monolithic filter body.

20. A gas filter according to claim 19 wherein said monolithic filter body is contained within and sintered to a gas impermeable outer shroud.

* * * * *